(12) United States Patent
Kobuna et al.

(10) Patent No.: US 11,436,488 B2
(45) Date of Patent: Sep. 6, 2022

(54) CONTROL DEVICE

(71) Applicant: TOYOTA JIDOSHA KABUSHIKI KAISHA, Aichi-ken (JP)

(72) Inventors: Shunsuke Kobuna, Shizuoka-ken (JP); Eiki Kitagawa, Odawara (JP); Daiki Yokoyama, Gotemba (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/660,808

(22) Filed: Oct. 23, 2019

(65) Prior Publication Data

US 2020/0134452 A1 Apr. 30, 2020

(30) Foreign Application Priority Data

Oct. 30, 2018 (JP) .............................. JP2018-204090

(51) Int. Cl.
| | |
|---|---|
| *G06N 3/08* | (2006.01) |
| *B60W 20/11* | (2016.01) |
| *G08G 1/14* | (2006.01) |
| *B60W 50/06* | (2006.01) |
| *B60W 50/00* | (2006.01) |

(52) U.S. Cl.
CPC .............. *G06N 3/08* (2013.01); *B60W 20/11* (2016.01); *G08G 1/143* (2013.01); *G08G 1/148* (2013.01); *B60W 2050/0005* (2013.01); *B60W 2050/065* (2013.01)

(58) Field of Classification Search
CPC ....................................................... G06N 3/08
See application file for complete search history.

(56) References Cited

U.S. PATENT DOCUMENTS

| | | | |
|---|---|---|---|
| 2013/0096737 A1 | 4/2013 | Suganuma et al. | |
| 2019/0163826 A1* | 5/2019 | Arquero | G06F 16/951 |
| 2019/0250902 A1* | 8/2019 | Tateishi | G06F 11/00 |

FOREIGN PATENT DOCUMENTS

| | | | | |
|---|---|---|---|---|
| AU | 2008264146 A1 * | 7/2009 | ......... | B60L 11/1818 |
| CA | 2648972 A1 * | 6/2009 | ......... | B60L 11/1818 |
| CN | 102855773 A * | 1/2013 | | |
| CN | 102867407 A * | 1/2013 | | |
| CN | 107622301 A * | 1/2018 | | |
| CN | 108010378 A * | 5/2018 | ............. | G06Q 10/04 |
| CN | 108091166 A * | 5/2018 | ............. | E04H 6/422 |
| CN | 108417032 A * | 8/2018 | ............. | G06N 3/086 |
| CN | 108961816 A * | 12/2018 | .......... | G06N 3/0445 |
| CN | 106548254 B * | 5/2020 | | |
| CN | 108417032 B * | 5/2020 | ............. | G06N 3/086 |
| JP | 2009-167968 A | 7/2009 | | |

(Continued)

OTHER PUBLICATIONS

Automation Application, vol. 10, pp. 70-72, Oct. 2017, 6pp.

*Primary Examiner* — Shelley Chen
(74) *Attorney, Agent, or Firm* — Hauptman Ham, LLP (57) ABSTRACT

A control device mounted in a vehicle in which at least one controlled part is controlled based on an output parameter obtained by inputting input parameters to a learned model using a neural network, provided with a parked period predicting part predicting future parked periods of the vehicle and a learning plan preparing part preparing a learning plan for performing relearning of the learned model during the future parked periods based on results of prediction of the future parked periods.

6 Claims, 8 Drawing Sheets

(56) References Cited

FOREIGN PATENT DOCUMENTS

| | | | | |
|---|---|---|---|---|
| JP | 2009167968 A | * | 7/2009 | |
| JP | 201153954 A | | 3/2011 | |
| JP | 2011053954 A | * | 3/2011 | |
| JP | 2012-112277 A | | 6/2012 | |
| JP | 2012153257 A | * | 8/2012 | |
| JP | 2015-525924 A | | 9/2015 | |
| JP | 201837022 A | | 3/2018 | |
| JP | 2018037022 A | * | 3/2018 | ............ B60R 16/02 |
| WO | 2012002231 A1 | | 1/2012 | |

* cited by examiner

CONTROL DEVICE

RELATED APPLICATIONS

The present application claims priority of Japanese Patent Application No. 2018-204090, filed Oct. 30, 2018, the disclosure of which is hereby incorporated by reference herein in its entirety.

FIELD

The present disclosure relates to a control device.

BACKGROUND

Japanese Unexamined Patent Publication No. 2012-112277 discloses a control device for an internal combustion engine configured to be able to estimate a parameter used for controlling the internal combustion engine (flow rate of intake gas taken into combustion chamber of internal combustion engine) by a learned model using a neural network.

SUMMARY

To improve the precision of estimation of a learned model by machine learning using a neural network, it may be considered to perform relearning of the learned model, that is, relearning of the neural network, by a control device mounted in the vehicle. For relearning of a neural network, a large amount of processing is required, but on the other hand, there are limits to the processing resources of the control device mounted in the vehicle, so sometimes it becomes difficult to perform relearning of the neural network in parallel with other control by the control device during the operating period of the vehicle.

For this reason, it may be considered to perform the relearning of the neural network during a parked period of the vehicle, but as explained above, a large amount of processing is required for relearning of the neural network and as a result a large amount of time becomes required for relearning. Therefore, if the parked period is short, it is not possible to complete the relearning of the neural network during the parked period and the relearning of the neural network is liable to be unable to be suitably performed.

The present disclosure was made in view of such a problem and has as its object to enable suitable relearning of a neural network by a control device mounted in a vehicle in the limited processing resources of the control device.

To solve the above problem, according to one aspect of the present disclosure, there is provided a control device mounted in a vehicle in which at least one controlled part is controlled based on an output parameter obtained by inputting an input parameter into a learned model using a neural network. This control device comprises a parked period predicting part configured to predict future parked periods of the vehicle and a learning plan preparing part configured to prepare a learning plan for performing relearning of the learned model during future parked periods based on the results of prediction of the future parked periods.

According to this aspect of the present disclosure, it is possible to suitably perform relearning of a neural network by a control device mounted in a vehicle by the limited processing resources of the control device.

DESCRIPTION OF EMBODIMENTS

Below, an embodiment of the present disclosure will be explained with reference to the drawings. Note that in the following explanation, similar component elements are assigned the same reference notations.

Explanation of Internal Combustion Engine

Figure 1:
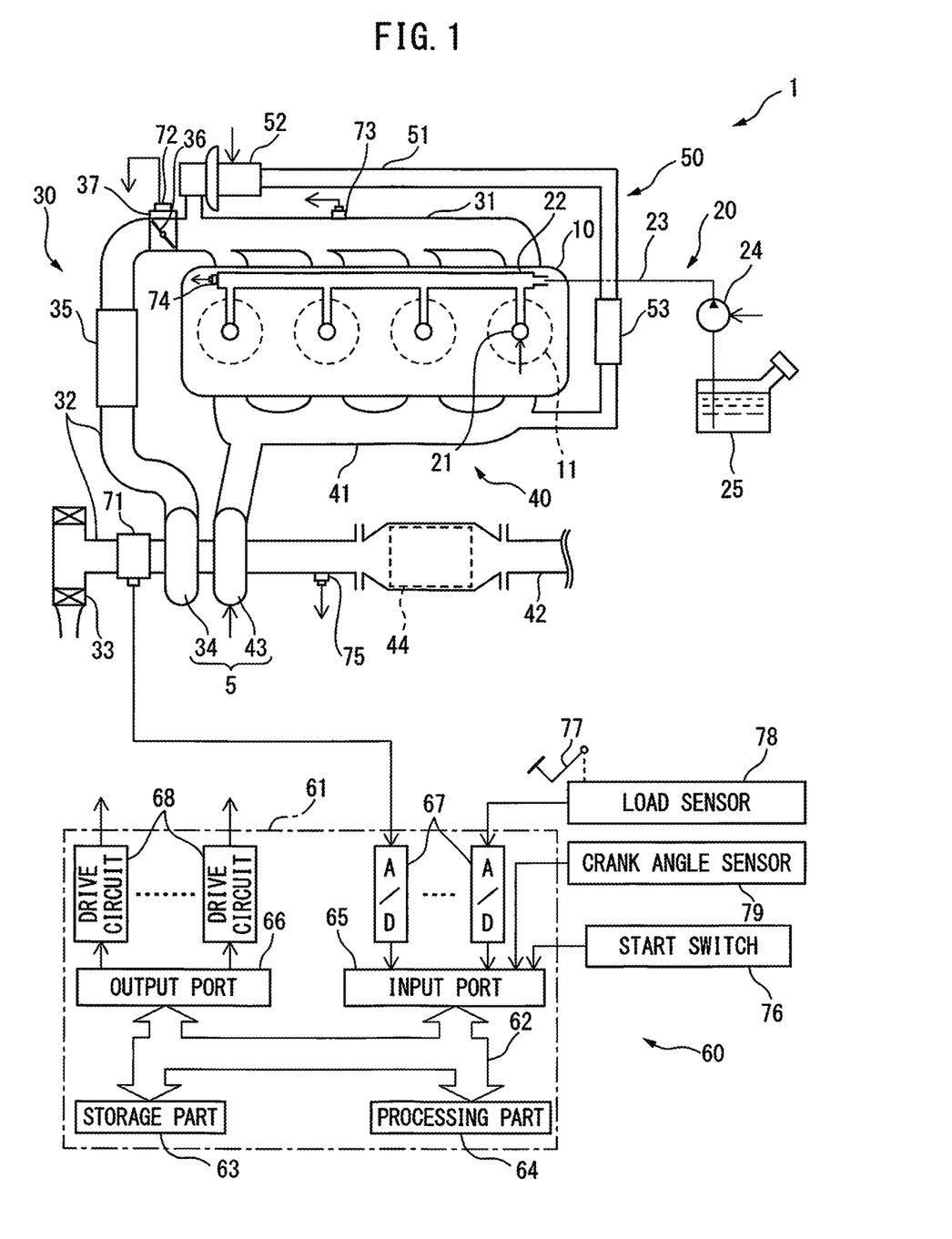
FIG. 1 is a schematic view of the configuration of an internal combustion engine mounted in a vehicle.

First, referring to FIG. 1, the configuration of an internal combustion engine 1 in which a control device according to the present embodiment is used will be explained. FIG. 1 is a schematic view of the configuration of the internal combustion engine 1 mounted in a vehicle. As shown in FIG. 1, the internal combustion engine 1 is provided with an engine body 10, fuel feed system 20, intake system 30, exhaust system 40, exhaust gas recirculation (EGR) system 50, and control system 60.

The engine body 10 is provided with a cylinder block in which a plurality of cylinders 11 are formed, a cylinder head in which intake ports and exhaust ports are formed, and a crank case. Inside each cylinder 11, a piston is arranged. Each cylinder 11 is communicated with an intake port and exhaust port.

The fuel feed system 20 is provided with fuel injectors 21, a common rail 22, fuel feed pipe 23, fuel pump 24, and fuel tank 25. The fuel injectors 21 are arranged at the cylinder head so as to directly inject fuel into the combustion chambers of the cylinders 11. The fuel injectors 21 are connected to the fuel tank 25 through the common rail 22 and fuel feed pipe 23. At the fuel feed pipe 23, a fuel pump 24 for pumping fuel inside the fuel tank 25 is arranged. The fuel pumped by the fuel pump 24 is supplied through the fuel feed pipe 23 to the common rail 22 and directly injected from the fuel injectors 21 to the insides of the combustion chambers of the cylinders 11. The pressure of the fuel inside the common rail 22 is adjusted by changing the output of the fuel pump 24. Therefore, the fuel pump 24 functions as a fuel pressure control device controlling the pressure of the fuel fed to the fuel injectors 21. Note that, the fuel injectors 21 may be configured so as to inject fuel inside the intake ports.

The intake system 30 is provided with an intake manifold 31, intake pipe 32, air cleaner 33, compressor 34 of a turbocharger 5, intercooler 35, and throttle valve 36. The intake port of each cylinder 11 is communicated through the intake manifold 31 and intake pipe 32 to the air cleaner 33. Inside the intake pipe 32, a compressor 34 of a turbocharger 5 compressing and discharging intake air circulating through the intake pipe 32, and an intercooler 35 cooling the air compressed by the compressor 34 are provided. The throttle valve 36 is made to turn by a throttle valve driving actuator 37 to change the opening area of the intake passage.

The exhaust system 40 is provided with an exhaust manifold 41, exhaust pipe 42, turbine 43 of a turbocharger 5, and particulate filter (below, simply referred to as a "filter") 44. The exhaust port of each cylinder 11 is communicated through the exhaust manifold 41 and exhaust pipe 42 to the filter 44. Inside the exhaust pipe 42, a turbine 43 of a turbocharger 5 driven to turn by the energy of the exhaust is provided. If the turbine 43 of the turbocharger 5 is driven to turn, along with this, the compressor 34 turns and the intake air is compressed. In the present embodiment, the turbine 43 of the turbocharger 5 is provided with a variable nozzle. By changing the opening degree of the variable nozzle, it is possible to change the rotational speed of the turbine 43. Therefore, by controlling the opening degree of the variable nozzle, it is possible to control the supercharging pressure.

The filter 44 traps particulate matter in the exhaust. Note that, the exhaust system 40 may also be provided with another exhaust purification device instead of the filter 44 or in addition to the filter 44 if a device for purifying exhaust, then discharging it into the outside air. Such an exhaust purification device, for example, includes a three-way catalyst, a selective reduction type NOx catalyst which reduces and purifies NOx in the exhaust gas, an NOx storage and reduction type catalyst, an oxidation catalyst, etc.

The EGR system 50 supplies part of the exhaust gas discharged from the engine body 10 to the intake passage. The EGR system 50 is provided with an EGR pipe 51, EGR control valve 52, and EGR cooler 53. The EGR pipe 51 connects the exhaust manifold 41 and the intake manifold 31 and communicates these with each other. In the EGR pipe 51, an EGR cooler 53 for cooling the EGR gas flowing through the inside of the EGR pipe 51 is provided. In addition, at the EGR pipe 51, an EGR control valve 52 able to change the opening area of the EGR passage formed by the EGR pipe 51 is provided. By controlling the opening degree of the EGR control valve 52, the flow rate of EGR gas recirculated from the exhaust manifold 41 to the intake manifold 31 is adjusted. As a result, the EGR rate changes. Note that, the EGR rate is the ratio of the amount of EGR gas to the total amount of gas supplied to the inside of a combustion chamber (total of amount of fresh air and amount of EGR gas).

Note that, in the present embodiment, as a supercharger for raising the pressure of the intake, the turbocharger 5 is used. However, if possible to raise the pressure of the intake, an electric compressor or mechanical type supercharger or other supercharger may also be used.

The control system 60 is provided with an electronic control unit (below, referred to as an "ECU") as the control device and with various types of sensors. The ECU 61 is comprised of a digital computer and is provided with components connected with each other through a bidirectional bus 62 such as a storage part 63, a processing part 64 provided with a CPU (microprocessor), input port 65, and output port 66. The storage part 63 is provided with a volatile memory (for example, RAM) and nonvolatile memory (for example, ROM) and stores the program run by the processing part 64 and various types of data.

At the intake pipe 32, an air flow meter 71 detecting the flow rate of air flowing through the intake pipe 32 is provided at the upstream side of the compressor 34 of the turbocharger 5 in the direction of flow of intake. At the throttle valve 36, a throttle opening degree sensor 72 for detecting the opening degree (throttle opening degree) is provided. Inside the intake manifold 31, a pressure sensor 73 for detecting the pressure (supercharging pressure) of the intake gas in the intake manifold 31 (below, referred to as the "supercharging pressure sensor") is provided. Further, at a common rail 22, a pressure sensor 74 for detecting a pressure of the fuel in the common rail 22, that is, the pressure of the fuel supplied to the fuel injectors 21 (below, referred to as the "fuel pressure sensor"), is provided. At the exhaust manifold 41 or exhaust pipe 42, an NOx sensor 75 for detecting the concentration of NOx in the exhaust discharged from the engine body 10 is provided. The outputs of these air flow meter 71, throttle opening degree sensor 72, supercharging pressure sensor 73, fuel pressure sensor 74, and NOx sensor 75 are input through the corresponding AD converters 67 to the input port 65.

Further, at the input port 65, a starting signal and stopping signal of the vehicle output from the start switch 76 are input. Further, at the accelerator pedal 77, a load sensor 78 generating an output voltage proportional to the amount of depression of the accelerator pedal 77 is connected. The output voltage of the load sensor 78 is input through a corresponding AD convertor 67 to the input port 65. Therefore, in the present embodiment, the amount of depression of the accelerator pedal 77 is used as the engine load. The crank angle sensor 79 generates an output pulse every time the crank shaft of the engine body 10 rotates by for example 10 degrees. This output pulse is input to the input port 65. At the processing part 64, the engine rotational speed is calculated from the output pulses of this crank angle sensor 79.

On the other hand, the output port 66 of the ECU 61 is connected to the actuators controlling the operation of the internal combustion engine 1 through the corresponding drive circuits 68. In the example shown in FIG. 1, the output port 66 is connected to the variable nozzle of the turbocharger 5, the fuel injectors 21, fuel pump 24, throttle valve drive actuator 37, and EGR control valve 52. The ECU 61 outputs control signals for controlling these actuators from the output port 66 to control the operation of the internal combustion engine 1.

Figure 2:
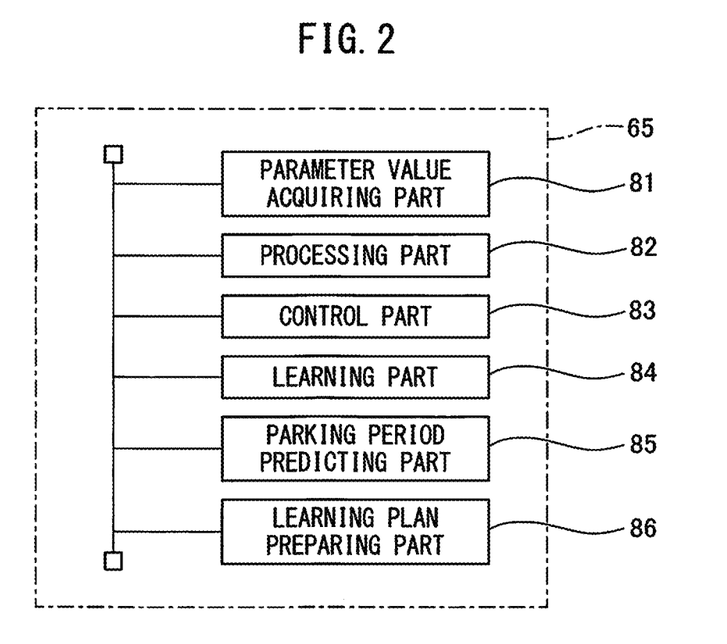
FIG. 2 is a functional block diagram in a processing part of an ECU.

FIG. 2 is a functional block diagram in the processing part 64 of the ECU 61. As shown in FIG. 2, the processing part 64 of the ECU 61 according to the present embodiment is provided with a parameter value acquiring part 81, processing part 82, control part 83, learning part 84, parked period predicting part 85, and learning plan preparing part 86.

The parameter value acquiring part 81 acquires values of input parameters showing the operating state of the internal combustion engine 1. Specifically, the parameter value acquiring part 81 acquires the outputs of the various sensors etc. mentioned above through the input port 65 of the ECU 61 as the values of the input parameters showing the operating state of the internal combustion engine 1. Further, the parameter value acquiring part 81 acquires the command values etc. from the ECU 61 to the fuel injectors 21 as the values of the input parameters showing the operating state of the internal combustion engine 1.

If the values of the input parameters are input, the processing part 82 uses a model using a neural network provided with a plurality of layers of an input layer, hidden layers, and output layer to calculate the value of an output parameter showing the performance of the internal combustion engine 1. Below, the case where the output parameter of the processing part 82 is the concentration of NOx in the exhaust is used as an example in the explanation, but the output parameter of the processing part 82 can be made various parameters such as the concentration of another substance in the exhaust, the output torque of the internal combustion engine 1, and the fuel efficiency of the internal combustion engine 1. Alternatively, the output parameter of the processing part 82 may be a parameter for controlling the internal combustion engine 1 (for example, judging whether fuel cut control is permissible).

The control part 83 controls the operation of the internal combustion engine 1 based on the value of the output parameter calculated by the processing part 82. For example, when the predicted value of the NOx concentration calculated by the processing part 82 is higher than the target concentration, the target opening degree of the EGR control valve 52 is corrected to become larger so as to lower the NOx concentration. On the other hand, when the predicted value of the NOx concentration calculated by the processing part 82 is lower than the target concentration, the target opening degree of the EGR control valve 52 is corrected to become smaller so as to raise the NOx concentration.

The learning part 84 performs the learning of the neural network (relearning) used when calculating the value of the output parameter at the processing part 82 in accordance with a learning plan prepared by the learning plan preparing part 86. The specific learning method used in the learning part 84 will be explained later.

The parked period predicting part 85 predicts the future parked periods of the vehicle, for example, from information on the past driving history of the vehicle. In the present embodiment, the parked period predicting part 85 stores the information of the times, days, etc. of the starting signals and stopping signals of the vehicle acquired in the past through the input port 65 of the ECU 61 as information on the past driving history in the storage part 63 and predicts the future parked periods of the vehicle (time periods from when receiving a stopping signal of the vehicle to when next receiving a starting signal of the vehicle) based on the stored information of past driving history.

The learning plan preparing part 86 prepares a learning plan for learning (relearning) of the neural network based on the results of prediction of the parked periods predicted at the parked period predicting part 85.

Summary of Neural Network

As explained above, the processing part 64 of the ECU 61 according to the present embodiment uses a learned model using a neural network to calculate the values of various parameters (output parameters) showing the performance of the internal combustion engine 1. Below, referring to FIG. 3, the neural network used in the processing part 82 will be explained.

Figure 3:
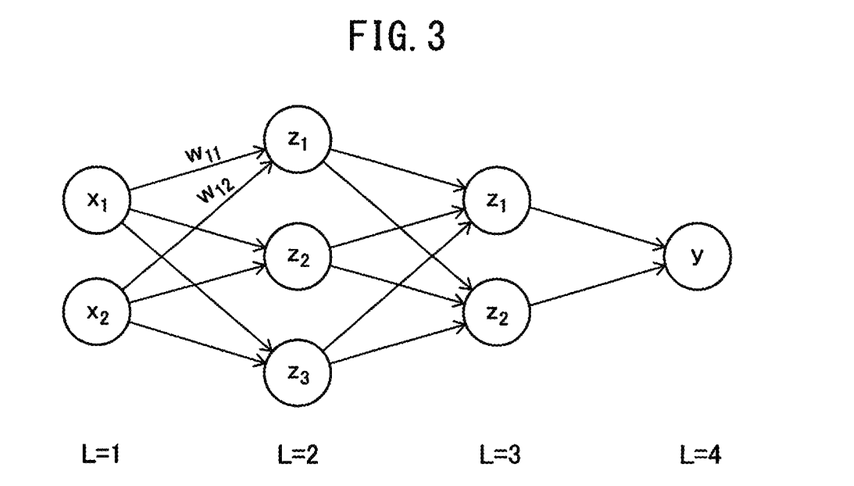
FIG. 3 is a view showing one example of a neural network.

FIG. 3 shows one example of a neural network. The circle marks in FIG. 3 show artificial neurons. In the neural network, such an artificial neuron is usually called a "node" or "unit" (in this Description, called a "node"). In FIG. 3, L=1 indicates an input layer, L=2 and L=3 indicate hidden layers, and L=4 indicates an output layer. Further, in FIG. 3, $x_1$ and $x_2$ indicate nodes of the input layer (L=1) and the output values from those nodes, while "y" indicates a node of the output layer (L=4) and its output value. Similarly, $z_1^{(L=2)}$, $z_2^{(L=2)}$, and $z_3^{(L=2)}$ indicate nodes of the hidden layer (L=2) and the output values from those nodes, and $z_1^{(L=3)}$ and $z_2^{(L=3)}$ indicate nodes of the hidden layer (L=3) and the output values from the nodes. Note that, the number of the hidden layers may be a single or any number, while the number of nodes of the input layer and number of nodes of the hidden layers may also be any numbers. Note that, in the present embodiment, there is a single node in the output layer.

At each of the nodes of the input layer, the input is output as it is. On the other hand, at each of the nodes of the hidden layer (L=2), the output values $x_1$ and $x_2$ of the nodes of the input layer are input. At the nodes of the hidden layer (L=2), respectively corresponding weights "w" and biases "b" are used to calculate the total input values "u". For example, in FIG. 3, a total input value $u_k^{(L=2)}$ calculated at a node shown by $z_k^{(L=2)}$ (k=1, 2, 3) of the hidden layer (L=2) is represented in the following equation (M is number of nodes of input layer):

$$u_k^{(L=2)} = \sum_{m=1}^{M} (x_m \cdot w_{km}^{(L=2)}) + b_k$$

Next, this total input value $u_k^{(L=2)}$ is converted by an activation function "f", and the output from the node shown by $z_k^{(L=2)}$ of the hidden layer (L=2) as the output value $z_k^{(L=2)} (=f(u_k^{(L=2)}))$. On the other hand, at each node of the hidden layer (L=3), the output values $z_1^{(L=2)}$, $z_2^{(L=2)}$, and $z_3^{(L=2)}$ of the nodes of the hidden layer (L=2) are input. At the nodes of the hidden layer (L=3), the respectively corresponding weights "w" and biases "b" are used to calculate the total input values "u" (=Σz·w+b). The total input values "u" are similarly converted by an activation function, and then output from the nodes of the hidden layer (L=3) as the output values $z_1^{(L=3)}$ and $z_2^{(L=3)}$. Note that, in the present embodiment, a Sigmoid function σ is used as this activation function.

On the other hand, the output values $z_1^{(L=3)}$ and $z_2^{(L=3)}$ of the nodes of the hidden layer (L=3) are input to the node of the output layer (L=4). At the node of the output layer, the corresponding weight "w" and bias "b" are used to calculate the total input value "u" (Σz·w+b), or only the corresponding weight "w" is used to calculate the total input value "u" (Σz·w). In the present embodiment, at the node of the output layer, an identity function is used as the activation function. Therefore, from the node of the output layer, the total input value "u" calculated in the node of the output layer is output as is as the output value "y".

Training at Neural Network

In the present embodiment, the backpropagation method is used for learning the values of the weights "w" and the values of the biases "b" in the neural network. This backpropagation method is known. Therefore, the backpropagation method will be simply explained below in outline. Note that, a bias "b" is a type of weight "w", therefore in the following explanation, a bias "b" is deemed to be one of the weights "w". Now then, in a neural network such as shown in FIG. 3, if expressing the weights at the input values $u^{(L)}$ to the nodes of the different layers of L=2, L=3, or L=4 as $w^{(L)}$, the differential of the error function E by the weight $w^{(L)}$, that is, the gradient $\partial E/\partial w^{(L)}$, can be rewritten as shown in the following equation:

$$\partial E/\partial w^{(L)} = (\partial E/\partial u^{(L)})(\partial u^{(L)}/\partial w^{(L)}) \quad (1)$$

Here, $z^{(L-1)} \cdot \partial w^{(L)} = \partial u^{(L)}$, therefore if $(\partial E/\partial u^{(L)}) = \delta^{(L)}$, the above equation (1) can be expressed by the following equation:

$$\partial E/\partial w^{(L)} = \delta^{(L)} \cdot z^{(L-1)} \quad (2)$$

In this regard, if $u^{(L)}$ fluctuates, fluctuation of the error function E is caused through change of the total input value $u^{(L+1)}$ of the next layer, therefore $\delta^{(L)}$ can be represented by the following equation (K is the number of nodes at the L+1 layer):

$$\delta^{(L)} = \left(\frac{\partial E}{\partial u^{(L)}}\right) = \sum_{k=1}^{K} \left(\frac{\partial E}{\partial u_k^{(L+1)}}\right)\left(\frac{\partial u_k^{(L+1)}}{\partial u^{(L)}}\right) (k=1,2,\ldots,K) \quad (3)$$

Here, if $z^{(L)} = f(u^{(L)})$, the input value $u_k^{(L+1)}$ appearing at the right side of the above equation (3) can be expressed by the following equation:

$$u_k^{(L+1)} = \sum_{k=1}^{K} w_k^{(L+1)} \cdot z^{(L)} = \sum_{k=1}^{K} w_k^{(L+1)} \cdot f(u^{(L)}) \quad (4)$$

Here, the first term $(\partial E/\partial u^{(L+1)})$ at the right side of equation (3) is $\delta^{(L+1)}$, and the second term $(\partial u_k^{(L+1)}/\partial u^{(L)})$ of the right side of equation (3) can be expressed by the following equation:

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (5)$$

Therefore, $\delta^{(L)}$ is shown by the following equation:

$$\delta^{(L)} = \sum_{k=1}^{K} w_k^{(L+1)} \cdot \delta^{(L+1)} \cdot f'(u^{(L)})$$

That is, $$\delta^{(L-1)} = \sum_{k=1}^{K} w_k^{(L)} \cdot \delta^{(L)} \cdot f'(u^{(L-1)}) \quad (6)$$

That is, if $\delta^{(L+1)}$ is obtained, it is possible to obtain $\delta^{(L)}$.

Figure 4:
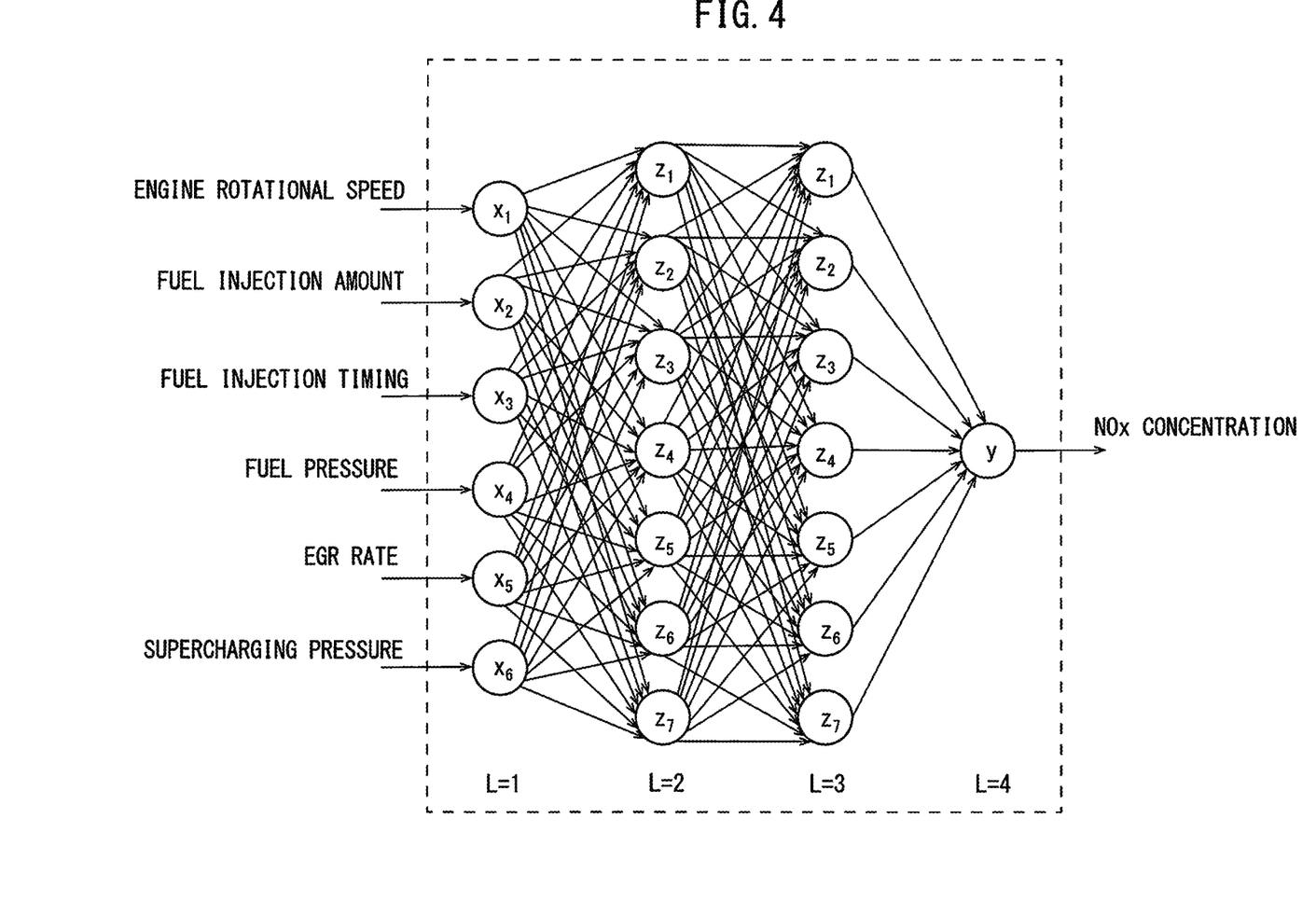
FIG. 4 is a view showing one example of a neural network.

Now then, training data including a certain input value "x" and true data $y_t$ of the output with respect to the input value "x" is sought. If the output value from the output layer with respect to the input value is "y", if the square error is used as the error function, the square error E is found by $E=\frac{1}{2}(y-y_t)^2$. In this case, at the node of the output layer (L=4) of FIG. 4, the output value "y" becomes $f(u^{(L)})$. Therefore, in this case, the value of $\delta^{(L)}$ at the node of the output layer (L=4) is shown by the following equation:

$$\delta^{(L)} = \partial E/\partial u^{(L)} = (\partial E/\partial y)(\partial y/\partial u^{(L)}) = (y-y_t) \cdot f'(u^{(L)}) \quad (7)$$

In this regard, in the present embodiment, as explained above, $f(u^{(L)})$ is an identity function and $f'(u^{(L1)})=1$. Therefore, $\delta^{(L)} = y - y_t$ and $\delta^{(L)}$ are obtained.

If $\delta^{(L)}$ is obtained, the above equation (6) is used to obtain the $\delta^{(L-1)}$ of the previous layer. In this way the $\delta$ of the previous layer are successively obtained. Using the values of $\delta$, from the above equation (2), the differential of the error function E, that is, the gradient $\partial E/\partial w^{(L)}$, is obtained for the weights "w". If the gradient $\partial E/\partial w^{(L)}$ is obtained, this gradient $\partial E/\partial w^{(L)}$ is used to update the values of the weights "w" so that the value of the error function E is decreased. That is, the values of the weights "w" are trained.

Example of Specific Model

Next, referring to FIG. 4, an example of a specific model using a neural network will be explained. FIG. 4 is a view showing one example of a neural network used in the computing part 82 of the present embodiment.

The neural network shown in FIG. 4 has an input layer (L=1), two hidden layers (L=2, 3), and an output layer (L=4). Further, in the neural network shown in FIG. 4, the input layer (L=1) is provided with six nodes, the output layer (L=4) is provided with one node, and the hidden layers (L=2, 3) are provided with seven nodes each. However, the neural network may have any number of layers so long as a number of three layers or more. Further, the number of nodes of each layer may be made any number.

In the present embodiment, at the nodes of the input layer (L=1), the values of specific input parameters showing the operating state of the internal combustion engine 1 are input. In the example shown in FIG. 5, as the input parameters, the rotational speed of the internal combustion engine 1, the fuel injection amounts and fuel injection timings from the fuel injectors 21, the pressure of the fuel supplied to the fuel injectors 21 (fuel pressure), the EGR rate, and the supercharging pressure are used.

In addition, in the present embodiment, the output layer (L=4) has only a single node. From this node, the value of a single output parameter (estimated value) is output. In the example shown in FIG. 4, as the output parameter, the concentration of NOx in the exhaust discharged from the internal combustion engine 1 (that is, in the exhaust before flowing into the filter 44) is used.

Therefore, in the neural network shown in FIG. 4, if the current values of the engine rotational speed, amount of fuel injection, timing of fuel injection, fuel pressure, EGR rate and supercharging pressure are input as values of the input parameters, the estimated value of the NOx concentration (current estimated value or future estimated value) is output as the value of the output parameter.

Therefore, if receiving as input the values of the above-mentioned input parameters during the operation of the internal combustion engine 1, the computing part 82 utilizes the model using the neural network to calculate the value of the output parameter. Specifically, the computing part 82 inputs the values of the parameters input to the computing part 82 into the input layer of the neural network and outputs the value of the output parameter output from the output layer of the neural network.

The values of the input parameters input to the computing part 82 are acquired by the parameter value acquiring part 81. Specifically, the engine rotational speed is calculated by the ECU 61 based on the output of the crank angle sensor 79. The parameter value acquiring part 81 acquires the thus calculated engine rotational speed from the ECU 61. The amount of fuel injection and the timing of fuel injection can be grasped from the command values output from the ECU 61 through the output port to the fuel injector 21, therefore the parameter value acquiring part 81 acquires the amount of fuel injection and the timing of fuel injection based on the command values to the fuel injector 21. The fuel pressure is detected by the fuel pressure sensor 74, therefore the parameter value acquiring part 81 acquires the fuel pressure based on the output value of the fuel pressure sensor 74.

The EGR rate cannot be directly measured, therefore is estimated from various types of parameters related to the EGR rate by known methods. For example, it is estimated at the ECU 61 based on the opening degree of the EGR control valve 52, the pressure of the intake gas in the intake manifold 31, the pressure of the exhaust gas in the exhaust manifold 41, etc. The parameter value acquiring part 81 acquires the thus estimated EGR rate from the ECU 61. The supercharging pressure is detected by the supercharging pressure sensor 73, but the parameter value acquiring part 81 acquires the supercharging pressure based on the output value of the supercharging pressure sensor 73.

The current values of the input parameters acquired by the parameter value acquiring part 81 in this way are input to the computing part 82. As a result, the estimated value of the NOx concentration, which is the output parameter, is output from the computing part 82.

Necessity of Relearning of Learned Model

In this regard, the learning of the neural network shown in FIG. 4 (that is, learning of the value of the weight "w" and the value of the bias "b") is performed before the internal combustion engine 1 controlled using the learned model using the neural network is mounted in the vehicle. That is, the learning is performed in advance before shipment of the vehicles.

In performing the learning of the neural network, a large number of training data including the measured values of the input parameters and the measured values of the output parameters corresponding to the measured values of the input parameters (true data) is prepared. Further, by using the prepared large number of training data and using the above-mentioned error back propagation method to repeatedly update the value of the weight "w" and the value of the bias "b" in the neural network, the values of the weight "w" and the bias "b" are learned and a learned model using the neural network is generated. Further, such a generated learned model is loaded in the ECU 61 of each vehicle.

However, the large number of training data prepared at the time of learning of the neural network is not prepared using the internal combustion engine 1 actually mounted in the vehicle, but for example is prepared based on the data acquired by operating an internal combustion engine for training data preparation use on an engine bench etc.

Further, between the internal combustion engine 1 actually mounted in the vehicle and the internal combustion engine used for preparing the training data, while within the allowable range, there is certain extent of individual differences in the performance. Further, due to aging etc., sometimes the performance of the internal combustion engine 1 may change from the initial performance when mounting the vehicle.

For this reason, to improve the precision of estimation of the learned model using the neural network, after the internal combustion engine 1 is mounted in the vehicle, it can be said to be desirable to individually relearn the learned model and in turn the neural network in accordance with the performance of the internal combustion engine 1.

Therefore, in the present embodiment, in the processing part 64 of the ECU 61, it is possible to perform the relearning of the neural network. Specifically, during the operating period of the vehicle after the vehicle is shipped out (delivered), the value of the input parameters acquired by the parameter value acquiring part 81 and the value of the output parameter corresponding to the values of the input parameters are linked and stored in the storage part 63 and the training data is prepared based on the data stored in the storage part 63. Further, the training data prepared after shipment of the vehicle in this way can be used to relearn the neural network at the learning part 84 by the above-mentioned error back propagation method. Note that for the value of the output parameter, the value detected by the NOx sensor 75 can be used if for example performing the relearning of the neural network shown in FIG. 4.

Problem Point When Performing Relearning of Learned Model

In relearning of the neural network, the greater the number of training data used when relearning the neural network (amount of data), the more the precision of estimation of the learned model after relearning can be improved. However, the greater the number of training data used when relearning the neural network, the higher the processing load of the ECU 61 becomes and the longer the time required for relearning of the neural network.

For this reason, in the driving period of operation of the vehicle, the processing resources of the ECU 61 able to be utilized for relearning of the neural network are limited, so there is the problem that it is difficult for the ECU 61 mounted in the vehicle to perform relearning of the neural network in parallel with other control in real time in the operating period of the vehicle. In order to enable relearning of the neural network in real time during operation of the vehicle, a high processing capacity processor etc. would be necessary, so an increase in costs would be invited.

Therefore, for example, it may be considered to perform relearning of the neural network not during the operating period of the vehicle, but in the parked periods of the vehicle (periods from when start switch 76 is turned to off state to when it is turned to on state). If performing relearning of the neural network during the parked periods of the vehicle in this way, it is possible to utilize the majority of the processing resources of the ECU 61 for relearning of the neural network.

However, even if performing relearning of the neural network during a parked period of the vehicle, if the parked period is short, it is liable to be unable to complete the relearning of the neural network during the parked period and unable to suitably perform relearning of the neural network.

Therefore, in the present embodiment, the future parked periods are predicted from the information of the past driving history and the learning plan is prepared for performing relearning of the neural network based on the results of prediction of the future parked periods.

Figure 5:
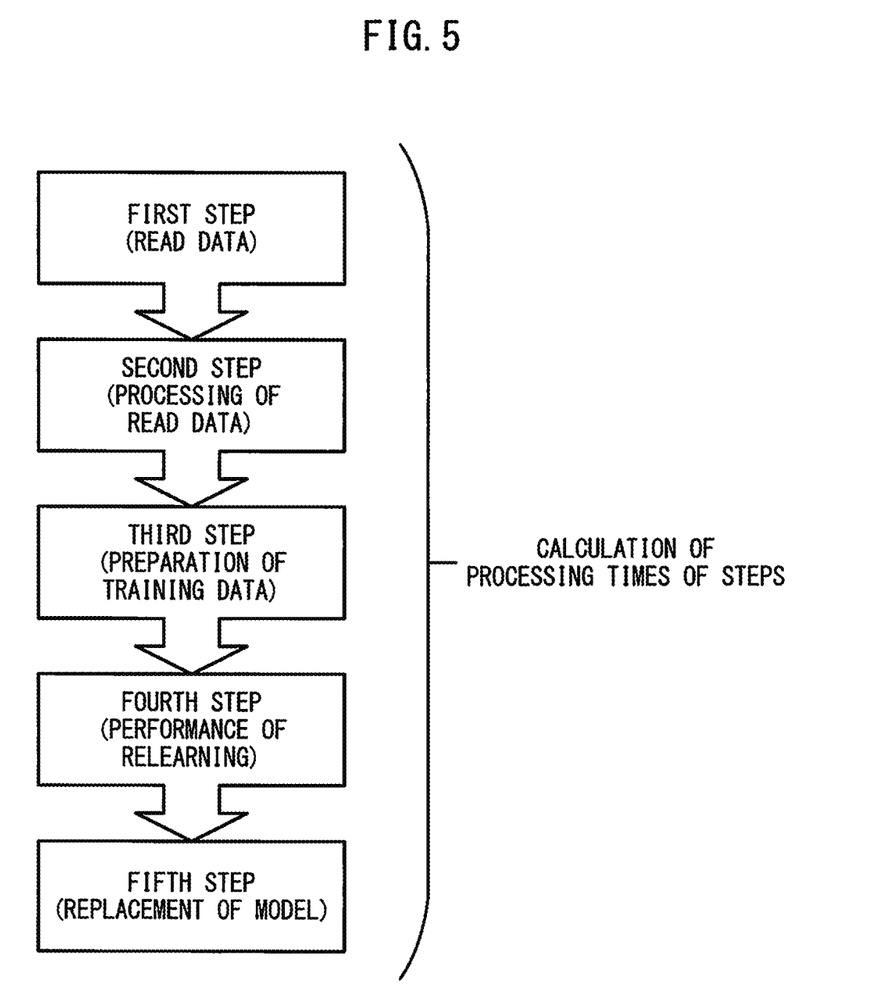
FIG. 5 is a view showing one example of a case of the process required for performing relearning of the neural network into a plurality of steps.

Specifically, first, the process required for performing relearning of the neural network is, for example, as shown in FIG. 5, divided into a plurality of steps and the processing time required for each step is calculated. Note that, in the present embodiment, the process required for performing relearning of the neural network is divided into the five steps of the first step to the fifth step.

The first step is a step where the processing part 64 reads in data obtained by linking the values of input parameters acquired by the parameter value acquiring part 81 during the operating period of the vehicle after the vehicle is shipped out (delivered) and the values of output parameters corresponding to the input parameters and storing them in the storage part 63. The second step is a step for processing the data read at the first step by, for example, averaging or filtering to remove noise. The third step is a step for preparing training data linking the values of input parameters and the values of output parameters corresponding to the values of the input parameters from the data processed at the second step. The fourth step is a step for using the training data prepared at the third step to perform the actual relearning of the neutral network by the above-mentioned error back propagation method. The fifth step is a step of replacing the learned model before the relearning at the fourth step with the learned model after the relearning in the fourth step.

Figure 6:
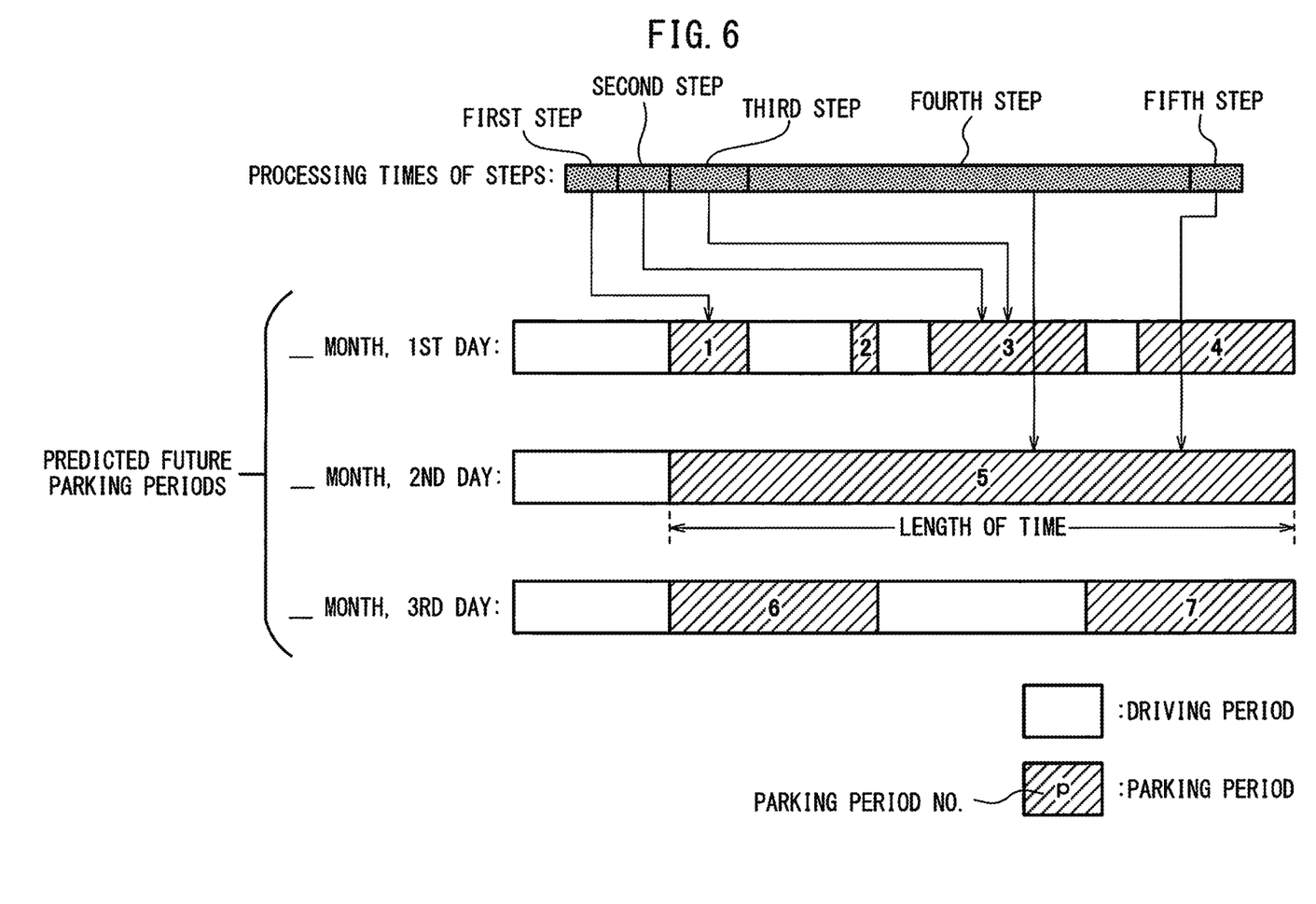
FIG. 6 is a view explaining a method of preparation of a learning plan according to one embodiment of the present disclosure.

Further, as shown in FIG. 6, the future parked periods are predicted from the information of the past driving history and a learning plan is prepared allocating, in order from the upstream step, the steps able to be completed in the parked periods to parked periods in order from the closest future parked period based on the lengths of time of the parked periods and the processing times of the steps. Further, the relearning of the neural network is performed during the parked periods of the vehicle based on the prepared learning plan. Note that, in FIG. 6, three future days worth of parked periods are shown, but naturally it is also possible to adjust the range of prediction within a range maintaining a certain degree of precision of prediction of the parked periods.

Control for Calculation of Processing Time of Each Step

Figure 7:
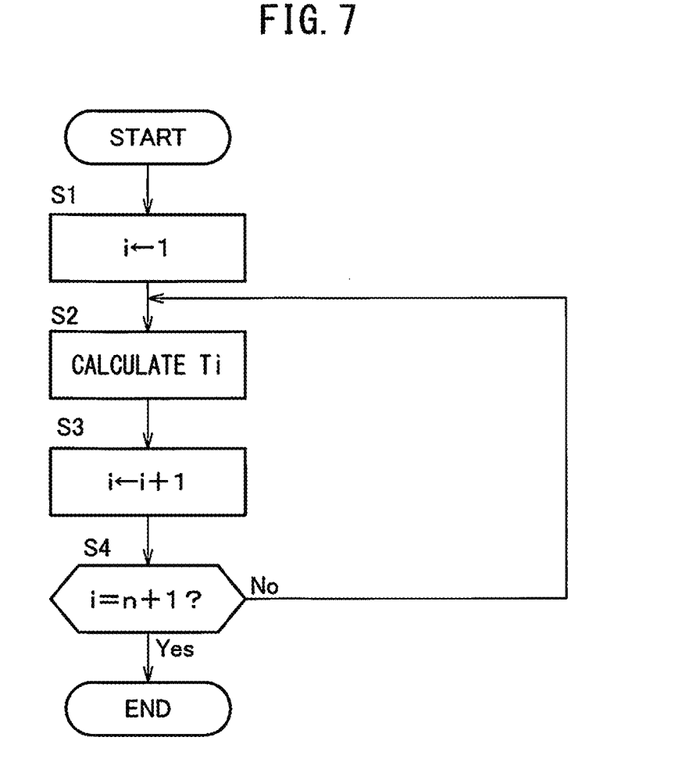
FIG. 7 is a flow chart explaining control for calculation of the processing times of different steps according to an embodiment of the present disclosure performed by an ECU.

FIG. 7 is a flow chart explaining the control for calculation of the processing time of each step according to the present embodiment performed by the ECU 61. The ECU 61 performs the present routine, for example, when driving over a predetermined distance, when the amount of data stored in the storage part 63 for preparing the training data becomes a predetermined amount or more, or another predetermined timing where it is able to be judged that sufficient training data required for relearning of the neural network, that is, an amount of training data enabling improvement of the precision of prediction of the learned model using a neural network, could be acquired.

At step S1, the ECU 61 sets step no. "i" (i=1 to "n": in the present embodiment, the process required for relearning of the learned model using the neural network is divided into five steps, so the value of "n" becomes 5) to 1.

At step S2, the ECU 61 calculates the processing time Ti required for the i-th step. The processing time required for each step is basically correlated with the amount of data read in at the first step. The greater the amount of data, the longer the time tends to become. Therefore, in the present embodiment, the relationship between the amount of data and the processing time of each step is found in advance by experiments etc. and the map of the relationship is referred to so as to calculate the processing time of each step.

At step S3, the ECU 61 adds 1 to the step no. "i" to update the step no. "i".

At step S4, the ECU 61 judges if calculation of the processing time of all of the steps has been completed. In the present embodiment, the ECU 61 judges that calculation of the processing time of all of the steps has been completed if step no. "i" is n+1 (in the present embodiment, 6). The ECU 61 ends the current processing if the calculation of the processing time of all of the steps has been completed. On the other hand, the ECU 61 returns to the processing of step S2 if the calculation of the processing time of all of the steps has not been completed.

Control for Preparation of Learning Plan

Figure 8:
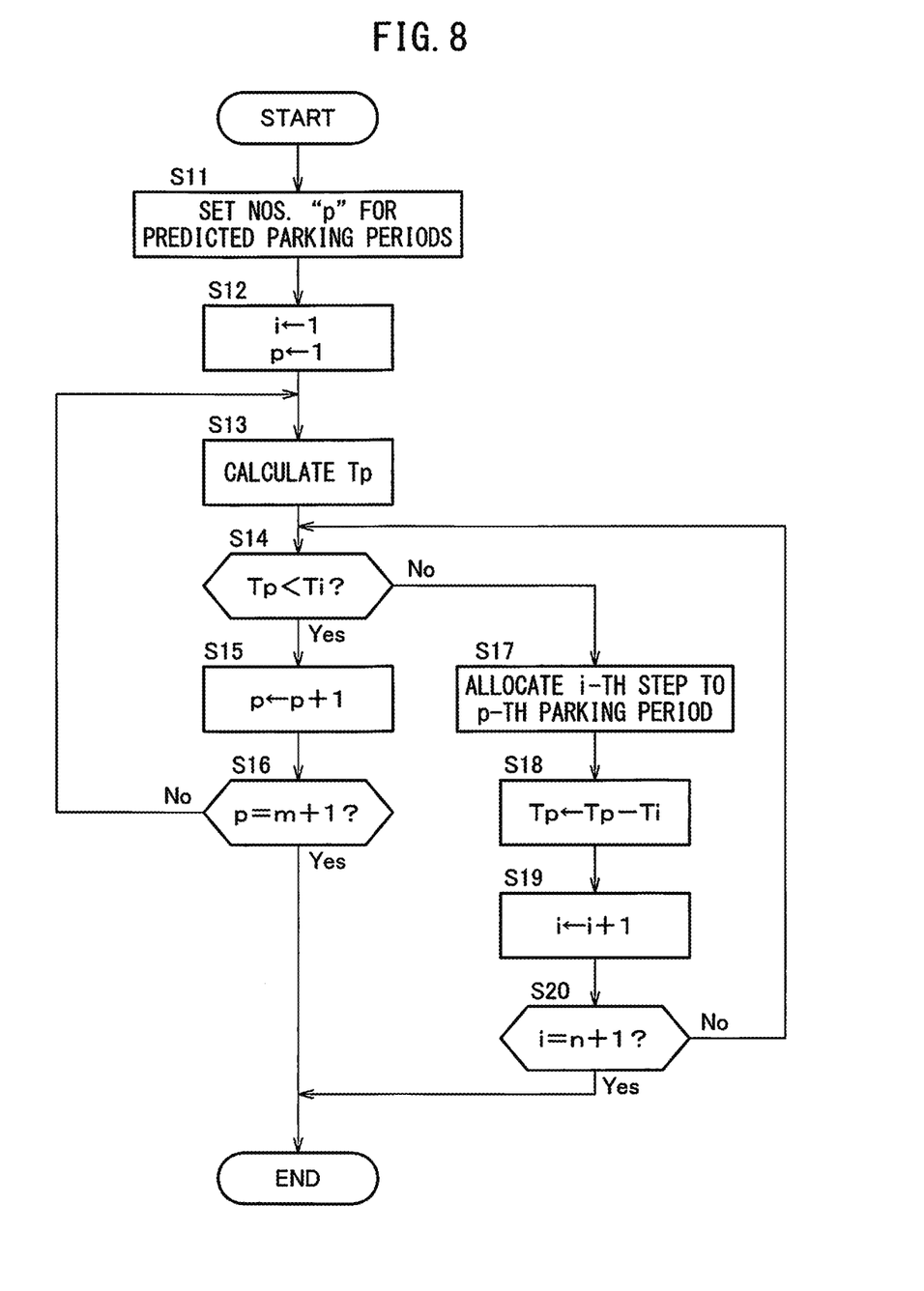
FIG. 8 is a flow chart explaining control for preparation of a learning plan according to an embodiment of the present disclosure performed by an ECU.

FIG. 8 is a flow chart explaining control for preparation of a learning plan according to the present embodiment performed by the ECU 61. The ECU 61 performs the present routine at the time for example when the control for calculation of the processing time of each step explained above ends.

At step S11, the ECU 61, as shown in FIG. 6, reads in the results of prediction of the parked periods extending over several days in the future predicted from the past driving history and sets the parked period no. "p" (1 to m: in the example shown in FIG. 6, m=7) in order from the closest future parked period.

At step S12, the ECU 61 sets the step no. "i" and the parked period no. "p" respectively to 1.

At step S13, the ECU 61 calculates the length of time Tp of the p-th parked period from the results of prediction of the parked periods shown in FIG. 6.

At step S14, the ECU 61 judges if there is a leeway in time for performing the i-th step in the p-th parked period. In the present embodiment, the ECU 61 judges if the length of time Tp of the p-th parked period is less than the processing time Ti of the i-th step and, if the length of time Tp of the p-th parked period is the processing time Ti of the i-th step or more, judges that there is a leeway in time for performing the i-th step in the p-th parked period.

If the length of time Tp of the p-th parked period is less than the processing time Ti of the i-th step, that is, if performing the i-th step in the p-th parked period and the p-th parked period is liable to end before completing the processing of the i-th step, the ECU 61 judges that there is no leeway in time for performing the i-th step in the p-th parked period and proceeds to the processing of step S15. On the other hand, if the length of time Tp of the p-th parked period is the processing time Ti of the i-th step or more, that is, if performing the i-th step in the p-th parked period and the possibility is high that the processing of the i-th step can be completed before the p-th parked period ends, the ECU 61 judges that there is a leeway in time for performing the i-th step in the p-th parked period and proceeds to the processing of step S17.

At step S15, the ECU 61 adds 1 to the parked period no. "p" to update the parked period no. "p".

At step S16, if the parked period no. "p" is m+1, the ECU 61 ends the current processing. On the other hand, if the parked period no. "p" is not m+1, the ECU 61 returns to the processing of step S13.

At step S17, the ECU 61 prepares a learning plan allocating the processing of the i-th step to the p-th parked period. That is, the ECU 61 prepares a learning plan performing the processing of the i-th step in the p-th parked period.

At step S18, the ECU 61 subtracts the processing time Ti of the i-th step from the length of time Tp of the p-th parked period to update the length of time Tp of the p-th parked period. That is, when the i-th step is performed in the p-th parked period, the ECU 61 calculates how much of the time for performing the next step (i+1-th step) remains.

At step S19, the ECU 61 adds 1 to the step no. "i" to update the step no. "i".

At step S20, the ECU 61 ends the current processing if the step no. "i" is n+1. On the other hand, the ECU 61 returns to the processing of step S14 if the step no. "i" is not n+1.

Control of Learning According to Learning Plan

Figure 9:
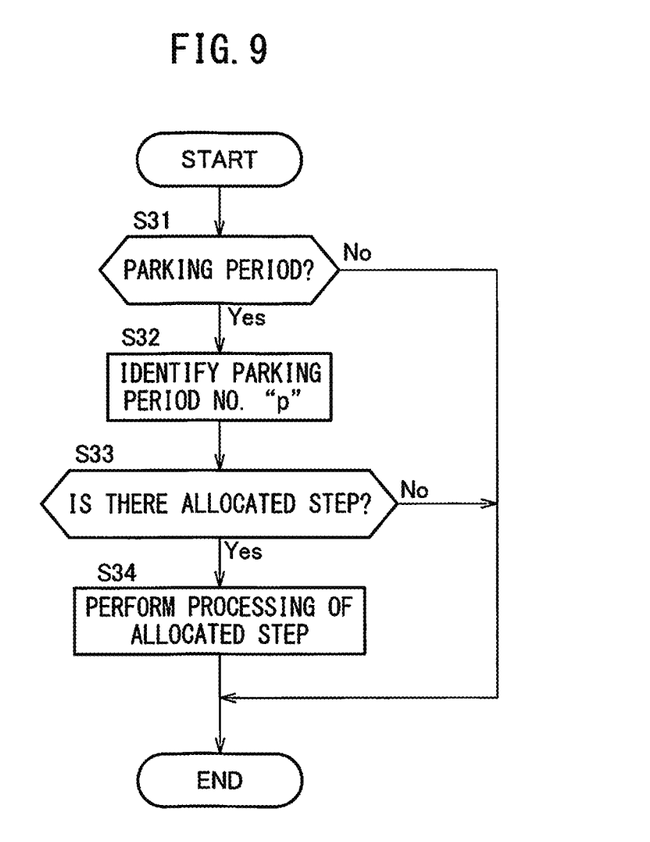
FIG. 9 is a flow chart explaining control for learning according to a learning plan according to an embodiment of the present disclosure performed by an ECU.

FIG. 9 is a flow chart explaining control for learning according to a learning plan according to the present embodiment performed by the ECU 61. The ECU 61 repeatedly performs the present routine by, for example, a predetermined processing cycle.

At step S31, the ECU 61 judges if the current time is a parked period of the vehicle, that is, if the state is one where the starting signal is still not received after receiving a stopping signal of the vehicle from the start switch 76. The ECU 61 proceeds to the processing of step S32 if a parked period of the vehicle. On the other hand, the ECU 61 ends the current processing if not a parked period of the vehicle.

At step S32, the ECU 61 identifies the parked period no. "p" of the current parked period based on the current time.

At step S33, the ECU 61 judges if there is a step allocated to the current parked period in the steps. The ECU 61 proceeds to the processing of step S34 if there is a step allocated to the current parked period. On the other hand, the ECU 61 ends the current processing if there is no step allocated to the current parked period.

At step S34, the ECU 61 performs processing of steps allocated to the current parked period. At this time, the ECU 61 performs processing in order from the step with the smallest step number if there are a plurality of steps allocated to a current parked period.

According to the present embodiment explained above, there is provided an ECU 61 (control device) mounted in a vehicle in which for example at least one controlled part such as an internal combustion engine 1 is controlled based on an output parameter obtained by inputting input parameters to a learned model using a neural network. This is configured provided with a parked period predicting part 85 predicting future parked periods of the vehicle and a learning plan preparing part 86 preparing a learning plan for performing relearning of a learned model in the future parked periods based on the results of prediction of the future parked periods.

In this way, according to the present embodiment, a learning plan is prepared based on the results of prediction of the future parked periods, so if performing relearning of the neural network during the parked periods of the vehicle, it is possible to prevent the situation from arising of a parked period ending up ending before relearning of the neural network is completed. For this reason, it is possible to suitably perform relearning of the neural network during the parked periods of the vehicle. Further, by performing relearning of the neural network during the parked periods of the vehicle, it is possible to utilize the majority of the processing resources of the ECU 61 for relearning of the neural network, so it is possible to effectively utilize the limited processing resources of the ECU 61.

In particular, according to the present embodiment, the process required for relearning of the learned model is divided in advance into a plurality of steps. The learning plan preparing part 86 is configured to prepare a learning plan by successively allocating steps able to be completed in the parked periods in order from the closest future parked period among the future parked periods from the upstream steps in the plurality of steps based on the lengths of time of the future parked periods and the processing time for each of the plurality of steps.

For this reason, it is possible to allocate, in order from the upstream step, steps able to be completed in the parked periods in order from the closest future parked period to the parked periods, so it becomes possible to allocate steps of processing times of suitable lengths to the parked periods. Further, it is possible to prevent much more the situation from arising of a parked period ending before relearning of the neural network is completed if performing relearning of the neural network during the parked periods of the vehicle.

Note that, the lengths of time of future parked periods are, for example, calculated based on the results of prediction of the future parked periods. Further, the processing time for each of the plurality of steps can be, for example, calculated based on the amount of data used at the time of relearning the learned model.

Further, in the present embodiment, one step of the plurality of steps is the fourth step performing actual relearning of the learned model using the training data (relearning step). This fourth step tends to become longest in processing time among the steps. Therefore, the learning plan preparing part 86 allocates the fourth step to a parked period in which the length of time of the future parked period is a certain constant length or more.

Further, the ECU 61 (control device) according to the present embodiment is configured so as to be further provided with a learning part 84 performing relearning of the learned model in accordance with the learning plan. Specifically, the learning part 84 is configured to judge that if the current parked period is the parked period of any of the future parked periods predicted by the parked period predicting part 85 and if there is a step allocated to the current parked period by the learning plan preparing part 86, to perform the processing of that step.

Due to this, it is possible to suitably perform the different steps required for relearning of the neural network during the parked periods of the vehicle in accordance with the learning plan.

Above, an embodiment of the present disclosure was explained, but the above embodiment only shows part of the examples of application of the present disclosure and does not limit the technical scope of the present disclosure to the specific constitution of the above embodiment.

For example, in the above embodiment, it is also possible to relearn part of the neural network at the fourth step (for example, the top hidden layer among the plurality of hidden layers) and at the fifth step replace the learned model before relearning at the fourth step with the learned model after partial relearning at the fourth step.

Further, in the above embodiment, the process required for performing relearning of the neural network was divided into a plurality of steps. However, it is also possible to prepare a learning plan so as to perform all of the processing in a future parked period enabling completion of all of the first step to the fifth step without dividing the process required for performing relearning of the neural network.

Here, the time required for completing all of the processing from the first step to the fifth step changes according to the amount of data which had been stored in the storage part 63 for preparing the training data, but there is a limit to the amount of data able to be stored in the storage part 63. For this reason, the upper limit value of the time required for completing all of the processing from the first step to the fifth step can be grasped in advance.

Therefore, it is possible to prepare a learning plan as explained above by allocating all of the processing to a future parked period having a length of time longer than the upper limit value of the time required for completing all of the processing from the first step to the fifth step. That is, in this case, the learning plan preparing part 86 can be said to calculate the lengths of time of future parked periods based on the results of prediction of the future parked periods and prepare the learning plan so that the relearning of the learned model is performed in a future parked period having a length of time enabling completion of relearning of the learned model.

Further, in the above embodiment, the process required for performing relearning of the neural network was divided into the five steps of the first step to the fifth step and a learning plan was prepared so that the processings of the steps were performed in the parked periods. However, for example, since the processing load of the processing from the first step to the third step upstream from the fourth step actually performing the relearning of the learned model using the training data is relatively light, the processing may also be performed not during the parked periods of the vehicle, but during the operating period of the vehicle. Further, the learning plan may also be prepared so that the processing of the fourth step and the fifth step is performed in the parked periods.

Further, in the above embodiment, as the controlled part controlled based on an output parameter obtained by inputting input parameters to a model using a neural network, an internal combustion engine 1 was given as an example in the explanation, but the controlled part is not limited to the internal combustion engine 1. For example, if a hybrid vehicle, it is also possible to control one or both of the internal combustion engine 1 and motor based on an output parameter obtained by inputting input parameters to a model using a neural network. Further, if an electric vehicle, it is also possible to control the motor based on an output parameter obtained by inputting input parameters to a model using a neural network and, further, if a fuel cell vehicle, it is also possible to control the fuel cell based on the same.

The invention claimed is:

1. A control device mounted in a vehicle in which at least one controlled part is controlled based on an output parameter obtained by inputting input parameters to a learned model using a neural network, the control device comprising:
 a parked period predicting part configured to predict future parked periods of the vehicle; and
 a learning plan preparing part configured to prepare a learning plan for performing relearning of the learned model during the future parked periods based on results of prediction of the future parked periods
 wherein the process required for relearning of the learned model is divided in advance into a plurality of steps, and
 the learning plan preparing part is configured to prepare the learning plan by successively allocating steps able to be completed within the parked period from an upstream step in the plurality of steps to the future parked periods in order from the closest one among the future parked periods based on the lengths of time of the future parked periods and the processing time for each of the plurality of steps.

2. The control device according to claim 1, wherein
the learning plan preparing part is configured to:
 calculate lengths of time of the future parked periods based on the results of prediction of the future parked periods; and
 prepare the learning plan so that relearning of the learned model is performed at the future parked periods having lengths of time enabling relearning of the learned model to be completed.

3. The control device according to claim 1, wherein
the control device is further configured to:
 calculate lengths of time of the future parked periods based on the results of prediction of the future parked periods; and
 calculate a processing time for each of the plurality of steps based on an amount of data used at the time of relearning of the learned model.

4. The control device according to claim 1, wherein
the control device further comprises a learning part configured so as to perform relearning of the learned model in accordance with the learning plan.

5. The control device according to claim 1, wherein
the control device further comprises a learning part configured so as to perform relearning of the learned model in accordance with the learning plan, and
the learning part is configured to:
 judge which parked period of the future parked periods predicted by the parked period predicting part the current parked period is; and
 perform the processing of a step if there is a step allocated by the learning plan preparing part to the current parked period.

6. The control device according to claim 1, wherein
one step among the plurality of steps is a relearning step actually performing relearning of the learned model using training data, and
the learning plan preparing part is configured to allocate the relearning step to a parked period with a length of time of the future parked period of a predetermined length or more.

* * * * *